United States Patent
Stevens

[15] 3,702,496
[45] Nov. 14, 1972

[54] METHOD FOR MANUFACTURING MASKS TO BE USED FOR ORNAMENTING GLASS ARTICLES IN AN ABRASIVE BLASTING PROCESS

[72] Inventor: Charles Edward Stevens, East Grand Rapids, Mich.

[73] Assignee: John M. Exton, Trustee of the trust known for business purposes as the Exton Development Company, New York, N.Y.

[22] Filed: Aug. 24, 1970

[21] Appl. No.: 66,465

[52] U.S. Cl. .................29/472.9, 29/481, 51/262, 156/224, 156/253, 264/154
[51] Int. Cl. .........................................B23k 31/02
[58] Field of Search ........156/224, 253; 29/475, 480, 29/481, 472.9; 51/262; 264/154

[56] References Cited

UNITED STATES PATENTS

| 2,270,945 | 1/1942 | Frick | 51/262 X |
|---|---|---|---|
| 2,410,472 | 11/1946 | Wartha | 51/262 X |
| 3,097,124 | 7/1963 | Denenberg | 156/253 X |
| 3,295,263 | 1/1967 | Sovoca et al. | 51/262 |
| 3,455,770 | 7/1969 | Dahl, Jr. | 156/253 X |
| 3,498,404 | 3/1970 | Roberts | 152/253 X |
| 3,507,740 | 4/1970 | Gaspari | 51/262 X |
| 3,526,064 | 9/1970 | Spidell, Jr. | 51/262 |
| 3,579,926 | 5/1971 | Gaspari | 51/262 |

Primary Examiner—John F. Campbell
Assistant Examiner—Richard Bernard Lazarus
Attorney—Darby & Darby

[57] ABSTRACT

A method of manufacturing masks to be used for ornamenting a curved surface of a glass article in an abrasive blasting process, includes forming a laminate comprising a metal backing plate and plastic sheet to the curve of the article to be ornamented. After the mask has been curved, the desired design is cut, preferably with the mask openings diverging outwardly from the surface of the mask which is adapted to contact the glass article.

12 Claims, 8 Drawing Figures

*INVENTOR.*
CHARLES EDWARD STEVENS
BY Darby & Darby
*ATTORNEY*

METHOD FOR MANUFACTURING MASKS TO BE USED FOR ORNAMENTING GLASS ARTICLES IN AN ABRASIVE BLASTING PROCESS

The present invention relates to a method of manufacturing masks which are intended to be used in a process for ornamenting glass articles by abrasive blasting techniques. Specifically, the present invention is intended to be used to manufacture masks of the type which are used with the apparatus disclosed in Stevens U.S. Pat. No. 3,520,086 (hereinafter referred to as the Stevens patent) and the apparatus disclosed in application Ser. No. 66,467, filed on Aug. 24, 1970 in the name of Charles Edward Stevens and assigned to the assignee of this invention.

The Stevens patent and application relate to apparatus which is intended to be used in the production of ornamented glass articles of high quality. The process, however, is also dependent upon the quality of the mask which must mask fully those portions of the glass surface which are not to be ornamented and provide clear delineation (where desired) of the design consistent with practical limitations relating to mask life, operating speed, etc. A preferred mask construction is claimed in U.S. Pat. application Ser. No. 66,466, filed Aug. 24, 1970 in the name of Charles Edward Stevens and assigned to the assignee of this application.

In the Stevens patent, the openings are cut in the mask before it is bent or formed to the desired configuration, and it has been observed that in some cases a loss of definition may occur because of the difficulty in bending a narrow strip of metal to a desired radius of curvature. For example, if two slots are cut in a flat mask forming a relatively narrow strip therebetween, with the strip lying generally parallel to the axis about which the mask is to be curved, the narrow strip may not actually bend when the curved mask is formed. As a result, the edges of the strip will not be in close contact with the glass, causing image blurring around these edges.

This problem has been solved by a mask-making process in which the image areas are cut after the mask has been formed to the desired radius of curvature. In this way, regardless of how narrow any longitudinal "strip" may be, it will have assumed the curve of the completed mask prior to cutting. Consequently, the entire strip can be urged tightly against the glass thus avoiding any problems of blurring or other loss of definition.

The invention is described in further detail below with reference to the attached drawings wherein.

Figure 3A:
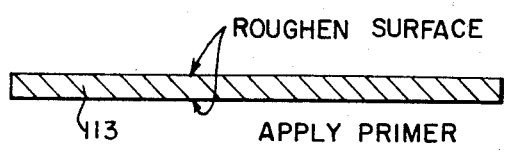
Figure 4:
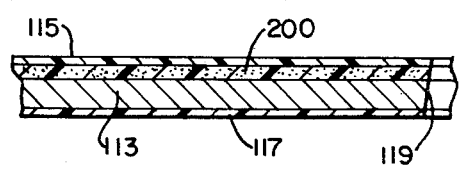

FIGS. 3A, B, C, D and E are diagrammatic illustrations showing the preferred process for manufacturing a mask in accordance with the invention; and FIG. 4 is a side sectional view of a modified mask construction which may be formed pursuant to the mask producing process of the invention.

In the following description, for ease in correlation, the same numerals are used to identify the mask as are used in the above-mentioned Stevens application Ser. No. 66,467.

Figure 1:
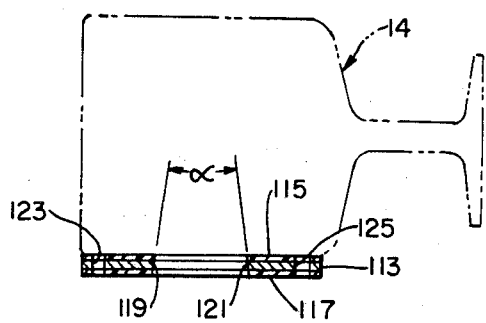
FIG. 1 is a side sectional view showing a mask as it would be applied to a glass tumbler.
Figure 2:
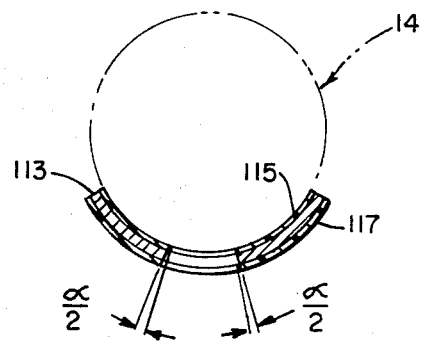
FIG. 2 is a front sectional view of a mask as it would be applied to a glass tumbler.

The construction of the mask is shown in FIGS. 1 and 2. In a typical embodiment, where the mask is to be applied to a curved surface such as the surface of a tumbler 14, the mask may be rectangular and curved to correspond to the shape of the article to be ornamented. It consists of a metal backing 113 bonded to a tough plastic sheeting 115 which may be made of polyurethane and which is adapted to contact the tumbler. The other side of backing palate 113 may be coated with a wear-resistant plastic 117 to protect the mask construction from the stream of abrasive particles during blasting.

The edges of the openings cut in the mask are represented by the slanted lines 119 and 121. As explained in the Stevens patent, divergence of the mask opening away from the article to be ornamented is an important feature of the mask construction. It has been found that where there is insufficient divergence of the edges of the mask openings, the engraved design will tend to be blurred. Where the angle of divergence is too great, excessive mask wear will result because of the relatively direct impingement of the abrasive particles on the exposed metallic and plastic surfaces. It has been discovered that an improvement in definition can be observed up to an included angle of divergence (shown as $\alpha$) of about four degrees (i.e. the angle formed at the intersection of the extensions of opposite sides 119 and 121 of the edge is four degrees). When the angle is greater than four degrees, there is no noticeable improvement in definition. Hence, this value of four degrees is regarded as an optimum value for the angle of divergence.

When examined in a cross section such as FIG. 2, the edges of the opening would "diverge" even if they were transverse (i.e. radial) to the surface of the glass. Hence, the term "divergence" should be interpreted herein to require divergence from a line perpendicular (radial) to the surface being ornamented.

Whether the edge of the mask opening is continuous or incremental, it is important that the distance between the plastic edge defining the actual opening and the reinforcing plate be small enough so that the pressure applied by the plate to the edge is sufficient to prevent abrasive particles from reaching the glass surface beneath the plastic.

In the Stevens patent, different arrangements are illustrated to provide diverging mask openings within the context of the invention. In the arrangements illustrated therein, such divergence is provided, at least in part, by an incremental change in spacing between the opening of the metal plate and the opening in the plastic sheet. In the presently preferred embodiment it is preferred that the edges of the mask openings (shown as surfaces 119 and 121 in FIG. 3E) be continuous as opposed to a steplike or incremental edge such as shown in the Stevens patent. However, as far as the mask is concerned, the general concept of diverging mask openings is intended to include both continuous and discontinuous edges. In fact, where the mask is produced with a continuous edge, during use, it is likely that a small part of the plate will be eaten away by the abrasive particles, forming a discontinuous edge.

A preferred material for the plastic sheet 115 is a polyurethane sold by the Armstrong Cork Company under Spec. No. PO 652 90–92. This material has a durometer reading of 90–92 and the thickness of the sheet may be about one sixteenth of an inch. In the illustrated embodiment, where the edges are continuous, the thickness of the plastic sheet is less important than where the edges are discontinuous. The overall thickness of the mask may thus be selected to optimize image definition and mask wear. As an example, where sheet 115 is 1/16th of an inch thick, backing plate 113 may be made of 22 gauge steel.

The coating 117 provides abrasion resistance for the bottom of the metal plate 113. Preferably, it comprises a sheet of plastic similar to sheet 115 bonded to plate 113. The thickness of coating 117 determines the mask life and one sixteenth inch has been found to be a practical dimension. Alternatively, coating 117 may be applied in a liquid form and permitted to dry. A liquid urethane elastomer sold under the trademark "ADIPRENE-1100" is suitable for this latter purpose.

The mask may also include registration holes 123 and 125 which are adapted to receive suitable pins (not illustrated, but shown as pins 102 and 104 in the Stevens application) to accurately position the mask on the mask carrier which carries the mask during the ornamenting process. The holes 123 and 125 can also serve the important function of accurately fixing the position of the design on the mask so that a sequence of masks can be applied to a glass article in precise relative positions.

The preferred process, according to the invention, for manufacturing a mask is shown diagrammatically in FIGS. 3A, B, C and D.

The steel plate 113 (FIG. 3A) is first grit blasted on both sides to provide roughened surfaces for better adherence. Next, it is coated on both sides with a metal primer and permitted to dry until all volatile solvents have evaporated. A suitable primer is sold under the trademark THIXON No. 936 by Dayton Chemical Products of Dayton, Ohio, a division of Whittaker Corporation. The plate is then cured in an air circulating cooling oven at a temperature of 150°F for about 1 hour.

The polyurethane sheet 115 and protective coating 117 are then cut to the desired size and one side of each is roughened by grit blasting and carefully cleaned with methyl ethyl ketone to rid the surface of dirt and greasy or oily substances which might have a deleterious effect of the subsequent bond.

Figure 3B:
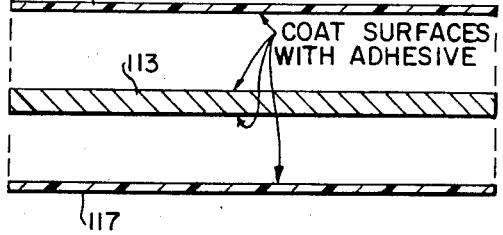

The clean surfaces of sheet 115 and coating 117, and both surfaces of plate 113 are then coated with an adhesive which will form a bond that will not weaken during the subsequent machining. This is shown diagrammatically in FIG. 3B. This adhesive may comprise a commercially available polyether based isocyanate sold under the trademark "THIXON AB 975" by Dayton Chemical Products Company, although other adhesives may also be used. This particular adhesive is a liquid urethane of 85 durometer. The adhesive coated surfaces are then permitted to air dry until all volatile materials have evaporated but not so long that the adhesive will not be tacky. Typically, this period will be from 45 to 60 minutes.

Figure 3C:
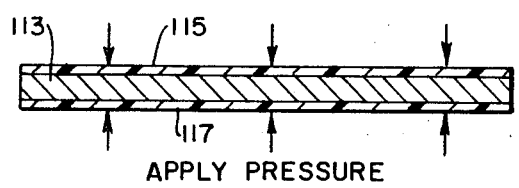

The sheets are then brought together as illustrated in FIG. 3C, care being taken to ensure intimate contact between the surfaces and to press out any entrapped air, and a substantial pressure of about 200 pounds per square inch in applied by a suitable clamp. The clamped laminate is cured at about 212°F for one hour and then at 150°F for twelve hours. Pressure is then removed.

Figure 3D:
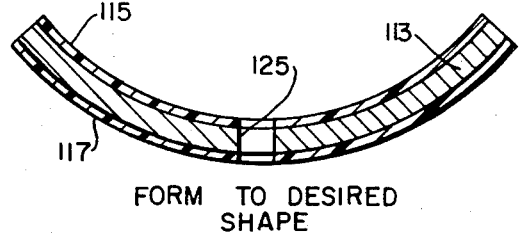

When the laminate has been formed, the registration holes 123 and 125 are drilled while the laminate is still flat. The laminate is then placed on a suitable die and pressure applied by a complementary member to form the laminate to a shape corresponding to the surface of the article to be ornamented, with the axis of mask curvature lying parallel to a line joining the centers of registration holes 123 and 125. This is diagrammatically illustrated in FIG. 3D. The forming die will include pins which fit into holes 123 and 125 to ensure this desired relationship which permits the design to be precisely located with respect to the mask.

Figure 3E:
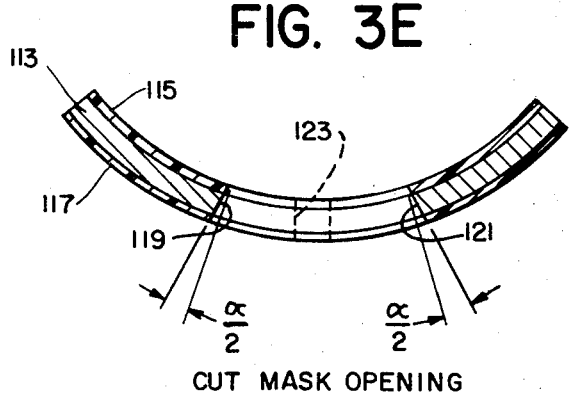

The final step is to cut the diverging mask openings as shown in FIG. 3E. In the preferred embodiment, this is done by a pantograph copy milling machine. A suitable machine for this purpose is sold by Franz Kuhlmann KG, of Wilhelmshaven, West Germany as Model GM 1/1. This machine can be equipped with a commercially available roll attachment which permits the curved mask to be cut by tracing a flat pattern, without distortion. The curved laminate should be clamped onto registration pins which are received within holes 123 and 125 during the cutting process so that the design opening can be accurately fixed relative to the holes 123 and 125. Desirably, the angle of divergence is four degrees, as noted above. However, where the milling head is of small diameter it may be necessary to employ an angle of about 6° to avoid breakage. Where the laminate has been formed as described above, the heat of the machining process will not affect the bonds between the three layers 113, 115 and 117.

It is contemplated that the protective coating 117 may be applied in a liquid form after the laminate has been shaped and either before or after cutting.

The process of the invention may also be used with other types of laminates. For example, as shown in FIG. 4, the laminate may include a thin sheet of foam 200 between the polyurethane sheet 115 and backing plate 113. The use of the foam sheet 200 may improve definition where the glass to be ornamented is not perfectly round because of the greater compressibility of the foam sheet. It is also possible to locate the foam sheet 200 between the polyurethane sheet 115 and the tumbler. Desirably, the foam material should be as thin as possible yet still capable of accommodating off-round tolerances.

The invention is not limited to the production of masks of any particular shape or which are intended to be used in a particular process or with particular apparatus. Where necessary for a particular purpose, further production steps may be used to complete the mask construction.

What is claimed is:

1. A method of making a mask for use in applying a design or other indicium to a curved surface of an article in an abrasive blasting process, comprising, providing a flat laminate of at least one sheet of plastic material bonded to a malleable reinforcing member, bending said flat laminate to the curve of the surface of the article to be ornamented, and thereafter cutting at least one opening in said laminate while it is in its curved condition through which the design is to be imparted to said surface.

2. A method according to claim 1, wherein said last-named step comprises cutting said opening so that the edge thereof diverges outwardly from the surface of the laminate which is adapted to contact the surface to be ornamented.

3. A method according to claim 1, wherein a coating of an abrasion resistant material is applied to the exposed surface of said reinforcing member after said opening is cut.

4. A method according to claim 1, wherein a coating of an abrasion resistant material is applied to the exposed surface of said reinforcing member before said laminate is bent.

5. A method according to claim 1, including the step of making at least two registration holes in said laminate prior to said forming step.

6. A method according to claim 5, wherein said laminate is formed as a surface of revolution, with the axis thereof lying parallel to a line joining the centers of said holes.

7. A method according to claim 6, wherein said last-named step comprises cutting said opening so that the edge thereof diverges outwardly from the surface of the laminate which is adapted to contact the surface to be ornamented.

8. A method according to claim 7, wherein the included angle between opposite sides of said edge in any single plane is between four and six degrees.

9. A method of making a mask for use in applying a design or other indicium to the curved surface of an article in an abrasive blasting process, comprising, preparing a flat laminate comprising a metal plate sandwiched between two plastic sheets, with two layers of adhesive being used to form permanent bonds between the plate and sheets, bending said flat laminate to the curve of the surface of the article to be ornamented, and thereafter cutting openings in said laminate while it is in its curved condition through which the design is to be imparted to said surface.

10. A method according to claim 9, including the step of drilling at least two registration holes in said laminate prior to said forming step.

11. A method according to claim 10, wherein said laminate is formed as a surface of revolution, with the axis thereof lying parallel to a line joining the centers of said holes.

12. A method of making a mask for use in applying a design or other indicium to a curved surface of a glass article in an abrasive blasting process, comprising providing a laminate of a sheet of plastic material bonded to a malleable reinforcing member, the laminate being formed to the curve of the surface of the glass article to be ornamented, and thereafter cutting at least one opening in said curved laminate through which the design is to be imparted to said surface.

* * * * *